US008886778B2

(12) United States Patent
Nedved et al.

(10) Patent No.: US 8,886,778 B2
(45) Date of Patent: Nov. 11, 2014

(54) SYSTEM AND METHOD FOR PROXYING NETWORK MANAGEMENT PROTOCOL COMMANDS TO ENABLE CLUSTER WIDE MANAGEMENT OF DATA BACKUPS

(75) Inventors: E. Rudolph Nedved, Mercer, PA (US); Brian O'Keefe, Moon Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 2483 days.

(21) Appl. No.: 11/119,136

(22) Filed: Apr. 29, 2005

(65) Prior Publication Data

US 2006/0248294 A1    Nov. 2, 2006

(51) Int. Cl.
*G06F 15/173* (2006.01)
*H04L 29/06* (2006.01)
*H04L 29/08* (2006.01)
*G06F 11/14* (2006.01)

(52) U.S. Cl.
CPC ............... *H04L 67/40* (2013.01); *H04L 67/00* (2013.01); *H04L 67/1097* (2013.01); *G06F 11/1458* (2013.01); *G06F 11/1464* (2013.01)
USPC ........................................................ 709/223

(58) Field of Classification Search
CPC . G06F 11/00; G06F 11/2023; G06F 11/1464; H04L 67/40; H04L 67/1097
USPC .................................................. 709/223, 202
See application file for complete search history.

(56) References Cited

U.S. PATENT DOCUMENTS

| 6,434,681 | B1 * | 8/2002 | Armangau | 711/162 |
| 6,889,294 | B1 * | 5/2005 | Nichols et al. | 711/147 |
| 7,451,199 | B2 * | 11/2008 | Kandefer et al. | 709/223 |
| 7,653,699 | B1 * | 1/2010 | Colgrove et al. | 709/213 |
| 2002/0116593 | A1 | 8/2002 | Kazar et al. | |
| 2004/0139145 | A1 | 7/2004 | Bar-or et al. | |
| 2004/0205143 | A1 | 10/2004 | Uemura | |
| 2004/0210724 | A1 * | 10/2004 | Koning et al. | 711/153 |
| 2005/0044163 | A1 * | 2/2005 | Kitamura et al. | 709/213 |
| 2005/0138195 | A1 * | 6/2005 | Bono | 709/231 |

FOREIGN PATENT DOCUMENTS

| EP | 1 517 230 A2 | 3/2004 |
| WO | WO 01/44891 A2 | 6/2001 |

OTHER PUBLICATIONS

OpenAFS Reference Manual, Chas Williams, Russ Allbery, Alf Wachsmann, Elizabeth Cassell , 2000,IBM Corp, pp. 1-14 www. docs.openafs.org/Reference/index.html.*
Backup-Introduction to the backup command suite, Chas Williams, , Russ Allbery, Alf Wachsmann, Elizabeth Cassell , 2000,IBM Corp, pp. 1-4 www.docs.openafs.org/Reference/8/backup.html.*
vldb.DBO, Chas Williams, , Russ Allbery, AlfWachsmann, Elizabeth Cassell , 2000,IBM Corp, pp. 1-2 www.docs.openafs.org/Reference/5/vldb.DBO.html.*
Kaczmarski et al. "Beyond backup toward storage management". IBM Systems Journal. vol. 42, No. 2, 2003. pp. 322-337.*
Ouyang et al. "The NDMP-Plus Prototype Design and Implementation for Network Based Data Management". NPC 2004, LNCS 3222. pp. 493-497. 2004.*
Notification of Transmittal of the International Search Report and the Written Opinion of the International Searching Authority, or the Declaration. PCT/US2005/030877 Aug. 31, 2005.

\* cited by examiner

*Primary Examiner* — John Macilwinen
(74) *Attorney, Agent, or Firm* — Cesari and McKenna, LLP

(57) ABSTRACT

A system and method enables cluster-wide management of backup operations issued by one or more backup managers to nodes of a cluster using a network management protocol, such as NDMP. An NDMP daemon executing on each node is extended to include a processing module and a backup module. The processing module interfaces with a backup manager to interpret the backup operation and, if necessary, forward (proxy) that operation to another NDMP daemon on another node of the cluster for processing in accordance with cluster's unified namespace.

17 Claims, 11 Drawing Sheets

SYSTEM AND METHOD FOR PROXYING NETWORK MANAGEMENT PROTOCOL COMMANDS TO ENABLE CLUSTER WIDE MANAGEMENT OF DATA BACKUPS

FIELD OF THE INVENTION

The present invention is directed to data backup in network clusters and, in particular to proxying network management protocol commands to enable cluster wide management of data backups.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

The filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system is implemented within a storage operating system having a protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity partitions in a single disk) arranged according to a RAID 4, or equivalent high-reliability, implementation.

It is advantageous for the services and data provided by a filer or storage system to be available for access to the greatest degree possible. Accordingly, some storage system environments provide a plurality of storage systems (i.e. nodes) in a cluster where data access request processing may be distributed among the various nodes of the cluster. Distributed processing in the cluster is enabled, in part, by a unified namespace presented to clients. As used herein, the term "unified namespace" denotes that any volume may be presented and served by any node of the cluster even if the volume is not directly connected to the node. The cluster configuration ensures that each request is forwarded to the appropriate node that services a particular file system (or volume) for processing.

In addition, a collection of management processes executes on each node to provide cluster configuration (i.e., management data) for the nodes. Each of these processes has interfaces to a replicated database (RDB) that provides a persistent object store for the management data. The RDB replicates and synchronizes changes (updates) made to the management data by the management processes across all nodes of the cluster. The use of a unified namespace in combination with cluster configuration thus provides ease of management for an administrator of the cluster.

A noted disadvantage related to the unified namespace of a cluster arises when performing certain backup operations using a network management protocol, such as the Network Data Management Protocol (NDMP) defined in *Network Data Management Protocol Version* 4, dated April 2003, the contents of which are hereby incorporated by reference. In a network management protocol environment, a backup manager executing backup software transmits data access requests to the cluster to perform, e.g., desired backup/restore operations. As a result of the unified namespace feature, described above, these requests may be directed to any one of a plurality of nodes within the cluster for servicing.

When using a backup/restore protocol such as NDMP, a request directed to initiate a backup operation of a particular volume typically returns an error if the volume is not local (i.e., not directly connected) to the node receiving the request. Use of the NDMP protocol in a unified namespace cluster is further problematic when volumes are relocated from node to node for failover and/or load balancing purposes. The resulting errors that occur because the volumes are no longer local to the nodes receiving the backup operations present a disadvantage to the administrator, which must then track the physical locations of the volumes to ensure proper performance of the operations.

A solution to the above problem may require that the administrator update the configuration of the backup manager with the new location of each volume. However, the backup manager may "view" the relocated volume as a new volume, resulting in a next backup operation being treated as an original baseline backup operation, i.e., an entire volume "backup", instead of only an incremental backup. This, in turn, results in wasted storage space and an increase of bandwidth and resources, as well as an unnecessary baseline backup operation.

SUMMARY OF THE INVENTION

The present invention overcomes the disadvantages of the prior art by providing a system and method for enabling cluster-wide management of backup operations issued by one or more backup managers to nodes of a cluster using a network management protocol, such as NDMP. Each node of the cluster illustratively comprises a network element (N-blade) configured to receive a data access request to perform the backup operation and a disk element (D-blade) containing a file system configured to interface with a storage subsystem to process the operation. An NDMP daemon executing on each node is extended to include a processing module and a backup module. The processing module interfaces with a backup manager to interpret the backup operation and, if necessary, forward (proxy) that operation via the N-blade to another NDMP daemon on another node of the cluster for processing in accordance with cluster's unified namespace.

Specifically, the processing module determines whether a volume to which the backup operation is directed is "local", i.e., directly connected or owned, by the node receiving the operation. Determination of the node that owns (manages) the volume is made by querying a volume location database (VLDB). The VLDB is updated with the current location of each volume serviced by the cluster, along with the identity of the node (or D-blade) that currently services the volume. If the volume is local, then the local processing module cooperates with the file system and/or a dump engine on the D-blade of the local node to initiate the backup operation.

However, if the NDMP backup operation is directed to a volume that is not local, i.e., one that is served by a "remote" node of the cluster, the local processing module invokes the local backup module of the local NDMP daemon to proxy the operation via a first remote procedure call (RPC) to a remote backup module of a remote NDMP daemon executing on the remote node. Upon receiving the first RPC, the remote backup module extracts the backup operation and passes it to the remote processing module, which cooperates with the remote D-blade to process the operation. The remote backup module then returns any response via a second RPC to the local NDMP daemon. Note that in the case of a long running (backup) operation, the remote backup module may further initiate sending of an event notice to the local NDMP daemon via a third RPC. In either case since the backup manager "sees" only the local NDMP daemon of the cluster, that daemon returns the response to the backup manager.

BRIEF DESCRIPTION OF THE DRAWINGS

The above and further advantages of invention may better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
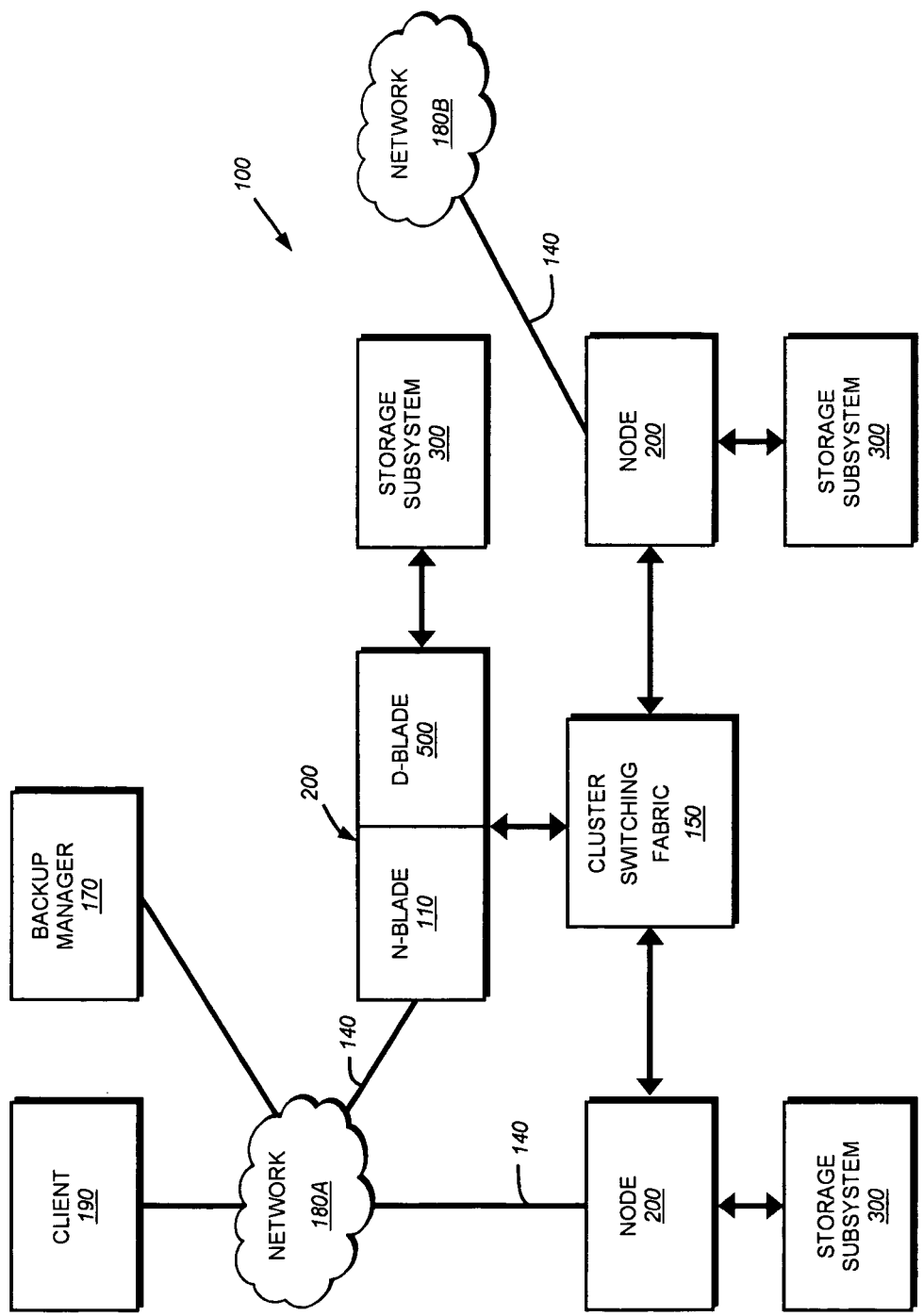
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. SpinFS is available from Network Appliance, Inc. of Sunnyvale, Calif. The term SpinFS is used herein without derogation of any trademark rights of Network Appliance. It should be noted that the use of the SpinFS file system is for illustrative purposes only and that the teachings of the present invention may be utilized with any suitable distributed clustering system. As such the term SpinFS should be taken to mean any acceptable clustering and/or distributed file system and/or protocol that may be adapted to utilize the teachings of the present invention.

To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Pat. No. 6,671,773, issued on Dec. 30, 2003, titled METHOD AND SYSTEM FOR RESPONDING TO FILE SYSTEM REQUESTS, by M. Kazar et al.

B. Storage Systems

Figure 2:
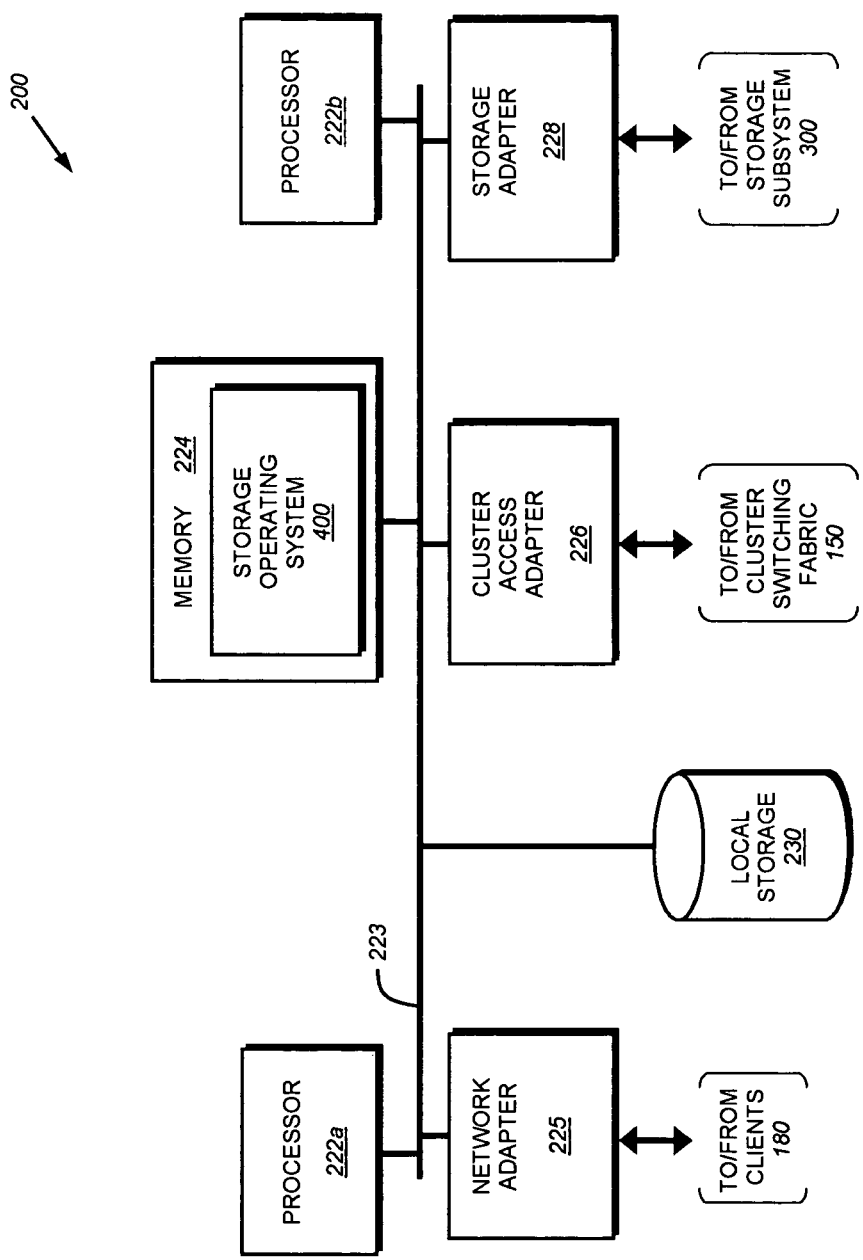
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, a local storage 230 and a storage adapter 228 interconnected by a system bus 223. The local storage 230 is utilized by the node to store local configuration information (i.e. management data) including its local copy of a replicated database (RDB) 850 (see FIG. 8). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients. In the illustrative embodiment, the storage adapter 228 is shown interfacing with storage subsystems 300. However, in alternate embodiments, the storage adapter 228 may directly interface with storage devices, such as disks. In such embodiments, the redundancy functionality provided by the RAID controller 330 (see FIG. 3) may be implemented within the storage operating system 400.

Figure 3:
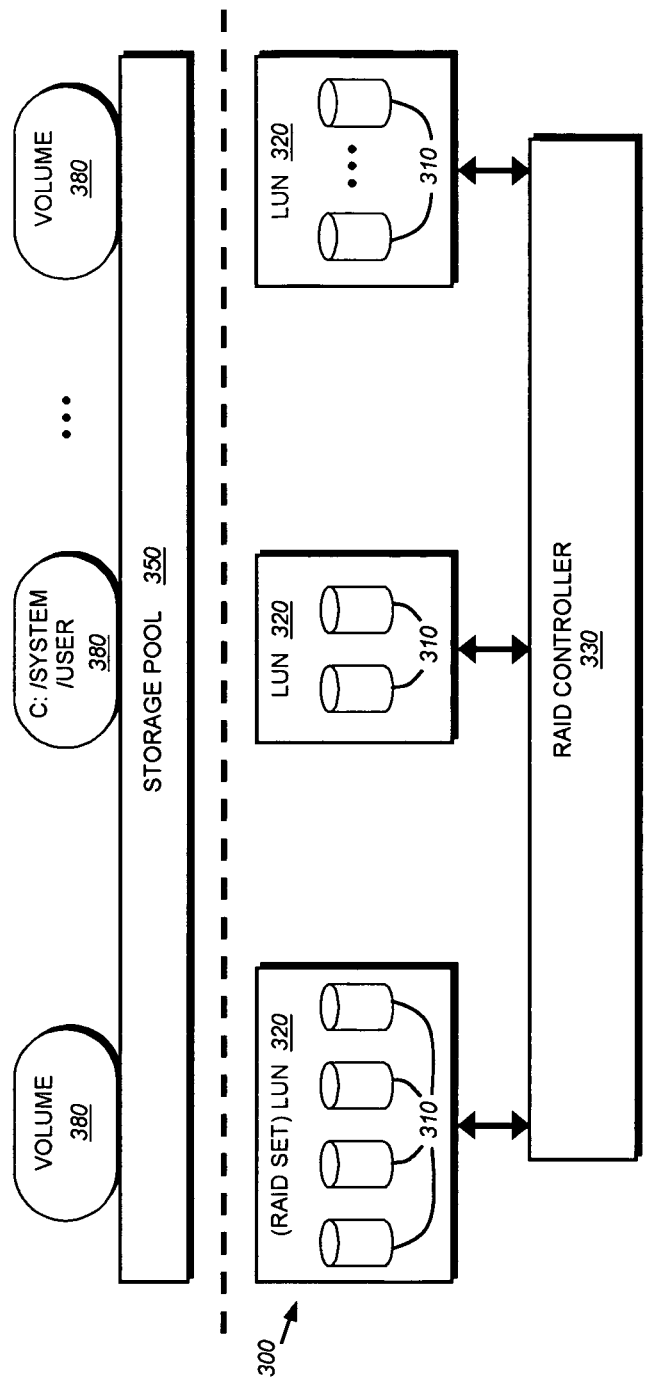
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of volumes 380, each of which is also owned by the D-blade. Each volume 380 may be organized within the storage pool according to a hierarchical policy that, among other things, allows the volume to be dynamically moved among nodes of the cluster, thereby enabling the storage pool 350 to grow and shrink dynamically (on the fly).

In the illustrative embodiment, a volume 380 comprises a root directory, as well as a number of subdirectories and files. A group of volumes may be composed into a larger namespace. For example, a root directory (c:) may be contained within a root volume ("/"), which is the volume that begins a translation process from a pathname associated with an incoming request to actual data (file) in a file system, such as the SpinFS file system. The root volume may contain a directory ("system") or a mount point ("user"). A mount point is a SpinFS object used to "vector off" to another volume and which contains the name of that vectored volume. The file system may comprise one or more volumes that are "stitched together" by mount point objects. As noted above, in certain embodiments, the functionality of the RAID controller 330 may be included within the storage operating system 400. In such embodiments, no separate storage subsystem 300 (other than disks 310) is required.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
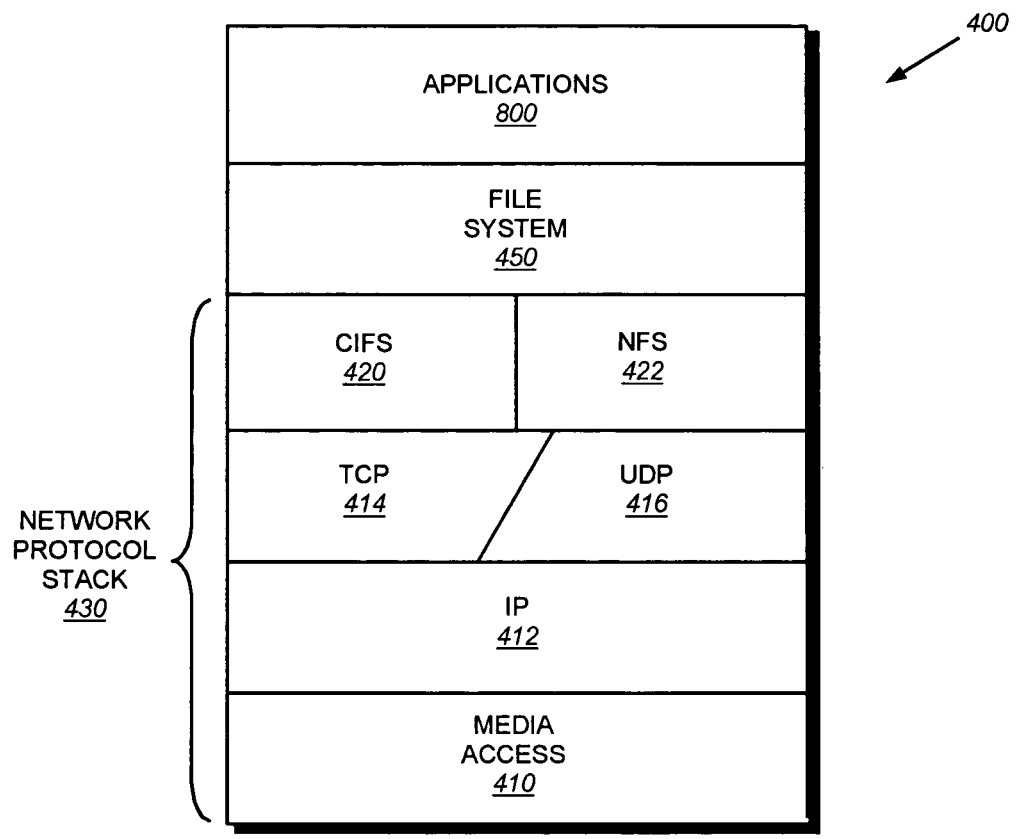
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (such as the SpinFS file system) and, thus, includes support for the CIFS protocol 220 and the NFS protocol 222. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 140. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

It should be noted that while this patent application is written in terms of the SpinFS protocol for communication among the various N-blades and D-blades of a cluster, the teachings of the present invention may be utilized with any acceptable distributed protocol.

D. D-Blade

Figure 5:
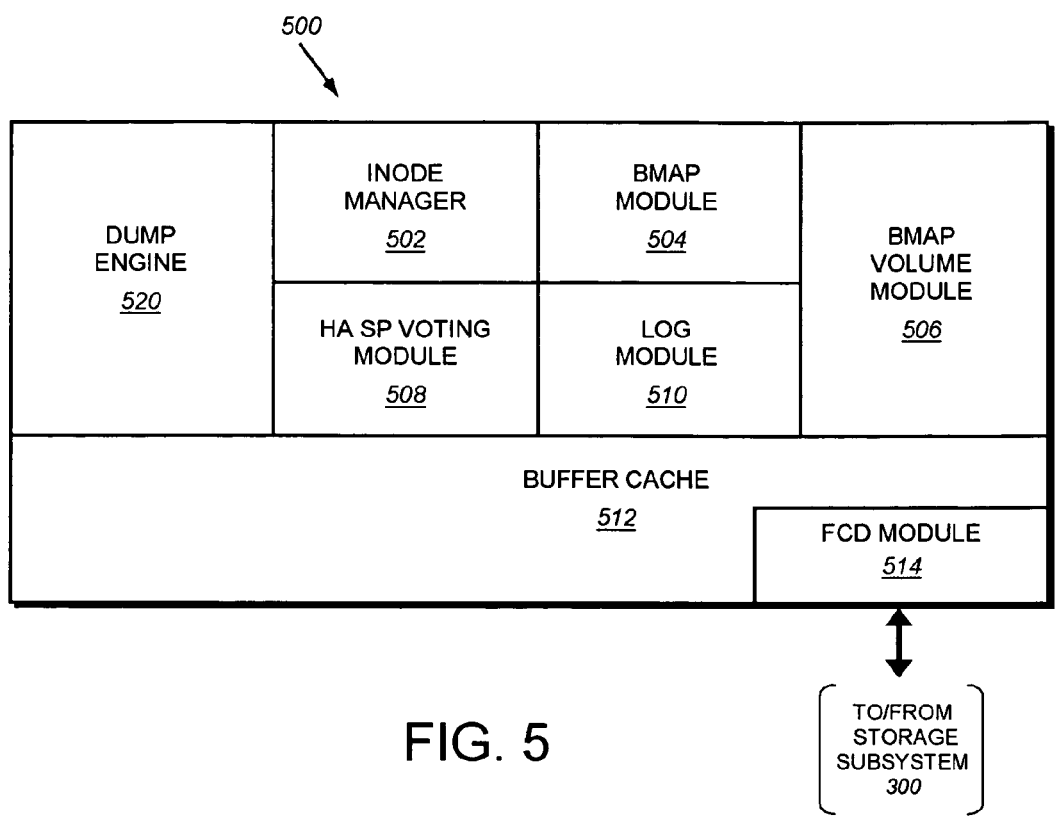
FIG. 5 is a schematic block diagram of a D-blade that may be advantageously used with the present invention.

In the illustrative embodiment, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504), a dump engine 520 and a Bmap volume module 506. The inode manager 502 is the processing module that implements the SpinFS (or other suitable file system) 450. The Bmap module 504 is responsible for all block allocation functions associated with a write anywhere policy of the file system 450, including reading and writing all data to and from the RAID controller 330 of storage subsystem 300. The Bmap volume module 506, on the other hand, implements all volume operations in the cluster 100, including creating and deleting a volume, mounting and unmounting a volume in the cluster, moving a volume, as well as cloning (snapshotting) and mirroring a volume. The D-blade also includes a high availability storage pool (HA SP) voting module 508, a log module 510, a buffer cache 512 and a fiber channel device driver (FCD) module 514.

The dump engine 520 is utilized for backup operations. Specifically, when a backup operation is initiated, the dump engine is instructed to perform a data dump (mass data transfer) of a volume to a specified destination. In response, the dump engine 520 copies the entire volume by interfacing with the inode manager 502 to forward the contents of the volume to the appropriate destination, which may be a network attached tape system or other suitable backup storage system.

E. SpinFS

Figure 6:
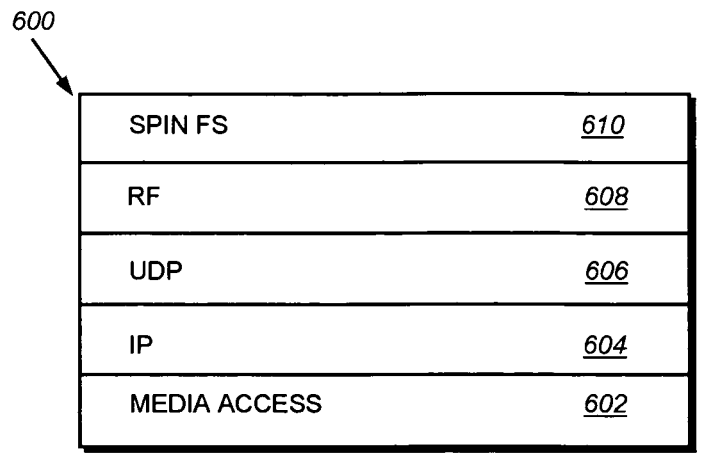
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
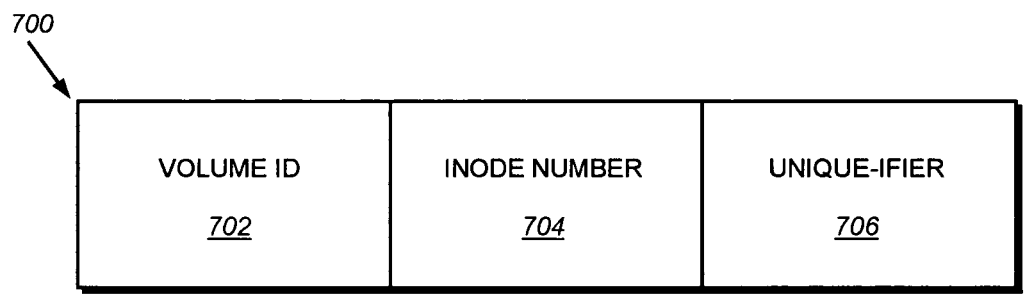
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a volume ID field 702, an inode number field 704 and a unique-ifier field 706. The volume ID field 702 contains an identifier of a volume that is unique (global) within the entire cluster 100. The inode number field 704 contains an inode number of a particular inode within an inode file of a particular volume. The unique-ifier field 706 contains a monotonically increasing number that uniquely identifies the file handle 700, particularly in the case where an inode number has been deleted, reused and reassigned to a new file. The unique-ifier distinguishes that reused inode number in a particular volume from a potentially previous use of those fields.

Figure 8:
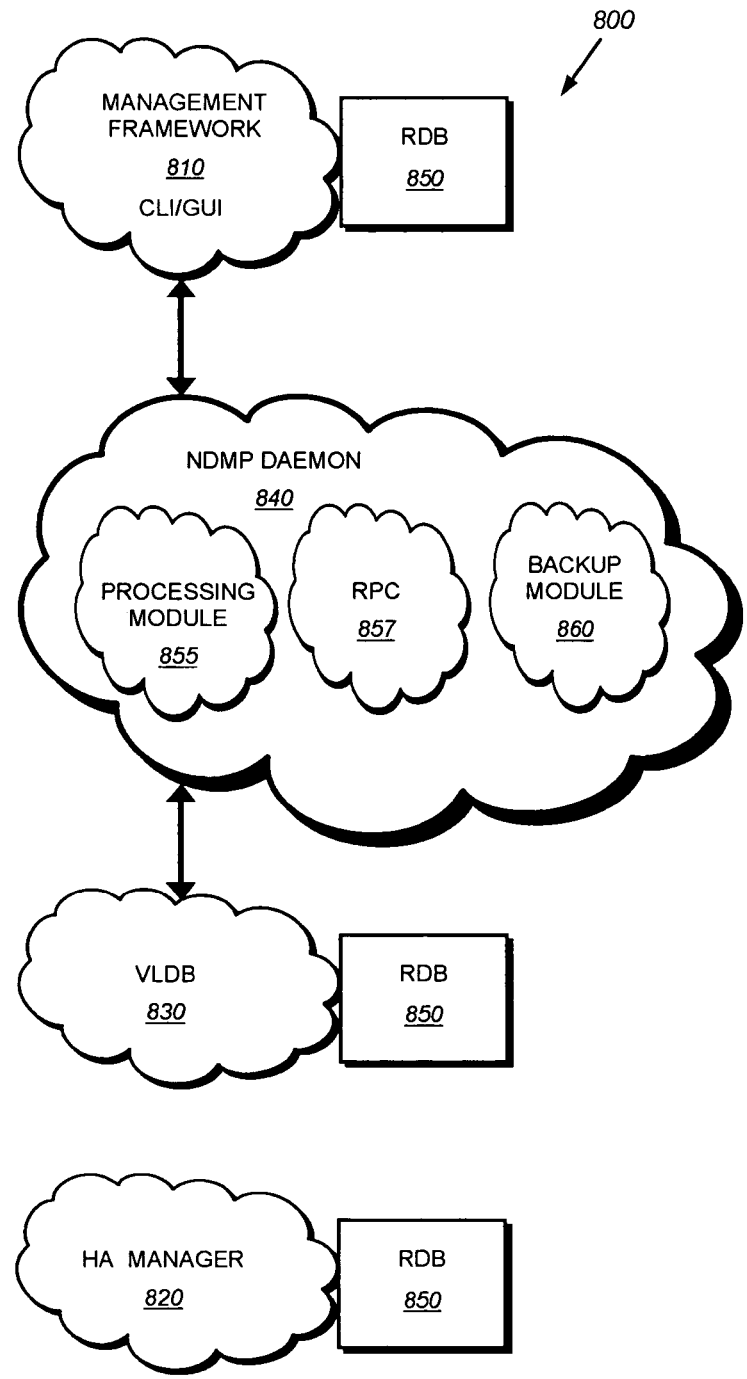
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a volume location database (VLDB) process 830 and a NDMP daemon 840, each utilizing a data replication service (RDB) 850 linked in as a library. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a volume) within the cluster 100 to thereby facilitate routing of requests throughout the cluster. In the illustrative embodiment, the N-blade 110 of each node has a look up table that maps the volume ID 702 of a file handle 700 to a D-blade 500 that "owns" (is running) the volume 380 within the cluster. The VLDB provides the contents of the look up table by, among other things, keeping track of the locations of the volumes 380 within the cluster. The VLDB has a remote procedure call (RPC) interface, e.g., a Sun RPC interface, which allows the N-blade 110 to query the VLDB 830. When encountering a volume ID 702 that is not stored in its mapping table, the N-blade sends an RPC to the VLDB process. In response, the VLDB 830 returns to the N-blade the appropriate mapping information, including an identifier of the D-blade that owns the volume. The N-blade caches the information in its look up table and uses the D-blade ID to forward the incoming request to the appropriate volume 380.

The NDMP daemon 840 implements the NDMP protocol for the node. In accordance with the illustrative embodiment of the present invention, the NDMP daemon 840 includes a processing module 855 and a backup module 860. Also included is a set of remote procedure calls (RPCs) 857 that implement the NDMP RPCs and are utilized for node to node communication. The processing module 855, described in detail further below, interfaces with one or more backup managers 170 and processes received NDMP commands. The backup module 860, described in detail further below, handles intra-cluster proxying of NDMP commands and responses in accordance with the present invention. Illustratively, the NDMP daemon 840 interfaces with the management framework 810 on a routine basis for administrative information such as user identifiers and passwords to utilize. The NDMP daemon 840 also interfaces with the VLDB 830 to determine the current location of a volume to which a request is directed.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that this RDB database is identical (has an identical image) on all of the nodes 200. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified volume 380 (and file), along with the appropriate D-blade 500 that "owns" that volume, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

Figure 9:
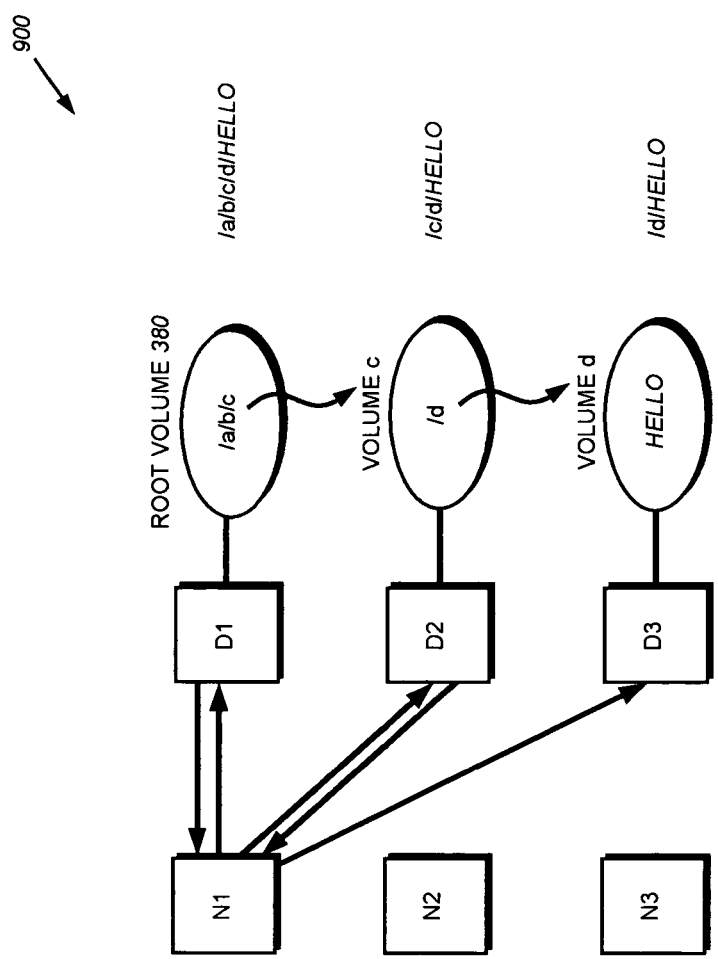
FIG. 9 is a schematic block diagram illustrating a distributed file system arrangement for processing a file access request in accordance with the present invention.

FIG. 9 is a schematic block diagram illustrating a distributed file system (SpinFS) arrangement 900 for processing a file access request at nodes 200 of the cluster 100. Assume a CIFS request packet specifying an operation directed to a file having a specified pathname is received at an N-blade 110 of a node 200. Specifically, the CIFS operation attempts to open a file having a pathname /a/b/c/d/Hello. The CIFS server 420 on the N-blade 110 performs a series of lookup calls on the various components of the pathname. Broadly stated, every cluster 100 has a root volume 380 represented by the first "/" in the pathname. The N-blade 110 performs a lookup operation into the lookup table to determine the D-blade "owner" of the root volume and, if that information is not present in the lookup table, forwards a RPC request to the VLDB 830 in order to obtain that location information. Upon identifying the D1 D-blade owner of the root volume, the N-blade 110 forwards the request to D1, which then parses the various components of the pathname.

Assume that only a/b/ (e.g., directories) of the pathname are present within the root volume. According to the SpinFS protocol, the D-blade 500 parses the pathname up to a/b/, and then returns (to the N-blade) the D-blade ID (e.g., D2) of the subsequent (next) D-blade that owns the next portion (e.g., c/) of the pathname. Assume that D3 is the D-blade that owns the subsequent portion of the pathname (d/Hello). Assume further that c and d are mount point objects used to vector off to the volume that owns file Hello. Thus, the root volume has directories a/b/ and mount point c that points to volume c which has (in its top level) mount point d that points to volume d that contains file Hello. Note that each mount point may signal the need to consult the VLDB 830 to determine which D-blade owns the volume and, thus, to which D-blade the request should be routed.

The N-blade (N1) that receives the request initially forwards it to D-blade D1, which send a response back to N1 indicating how much of the pathname it was able to parse. In addition, D1 sends the ID of D-blade D2 which can parse the next portion of the pathname. N-blade N1 then sends to D-blade D2 the pathname c/d/Hello and D2 returns to N1 an indication that it can parse up to c/, along with the D-blade ID of D3 which can parse the remaining part of the pathname. N1 then sends the remaining portion of the pathname to D3 which then accesses the file Hello in volume d. Note that the distributed file system arrangement 900 is performed in various parts of the cluster architecture including the N-blade 110, the D-blade 500, the VLDB 830 and the management framework 810.

F. NDMP Management of Backups

The present invention is directed to a system and method for enabling cluster-wide management of backup operations issued by one or more backup managers to nodes of a cluster using a network management protocol, such as NDMP. According to the invention, an NDMP daemon executing on each node is extended to include a processing module and a backup module. The processing module interfaces with a backup manager to interpret the backup operation and, if necessary, forward (proxy) that operation via the N-blade to another NDMP daemon on another node of the cluster for processing in accordance with cluster's unified namespace.

Specifically, the processing module determines whether a volume to which the backup operation is directed is "local", i.e., directly connected or owned, by the node receiving the operation. Determination of the node that owns (manages) the volume is made by querying the VLDB. As noted, the VLDB is updated with the current location of each volume serviced by the cluster, along with the identity of the node (or D-blade) that currently services the volume. If the volume is local, then the local processing module cooperates with the file system and/or dump engine on the D-blade of the local node to initiate the backup operation.

However, if the NDMP backup operation is directed to a volume that is not local, i.e., one that is served by a "remote" node of the cluster, the local processing module invokes the local backup module of the local NDMP daemon to proxy the operation via a first RPC to a remote backup module of a remote NDMP daemon executing on the remote node. Upon receiving the first RPC, the remote backup module extracts the backup operation and passes it to the remote processing module, which cooperates with the remote D-blade to process the operation. The remote backup module then returns any response via a second RPC to the local NDMP daemon. Note that in the case of a long running (backup) operation, the remote backup module may further initiate sending of an event notice to the local NDMP daemon via a third RPC. In either case since the backup manager "sees" only the local NDMP daemon of the cluster, that daemon returns the response to the backup manager.

Figure 10:
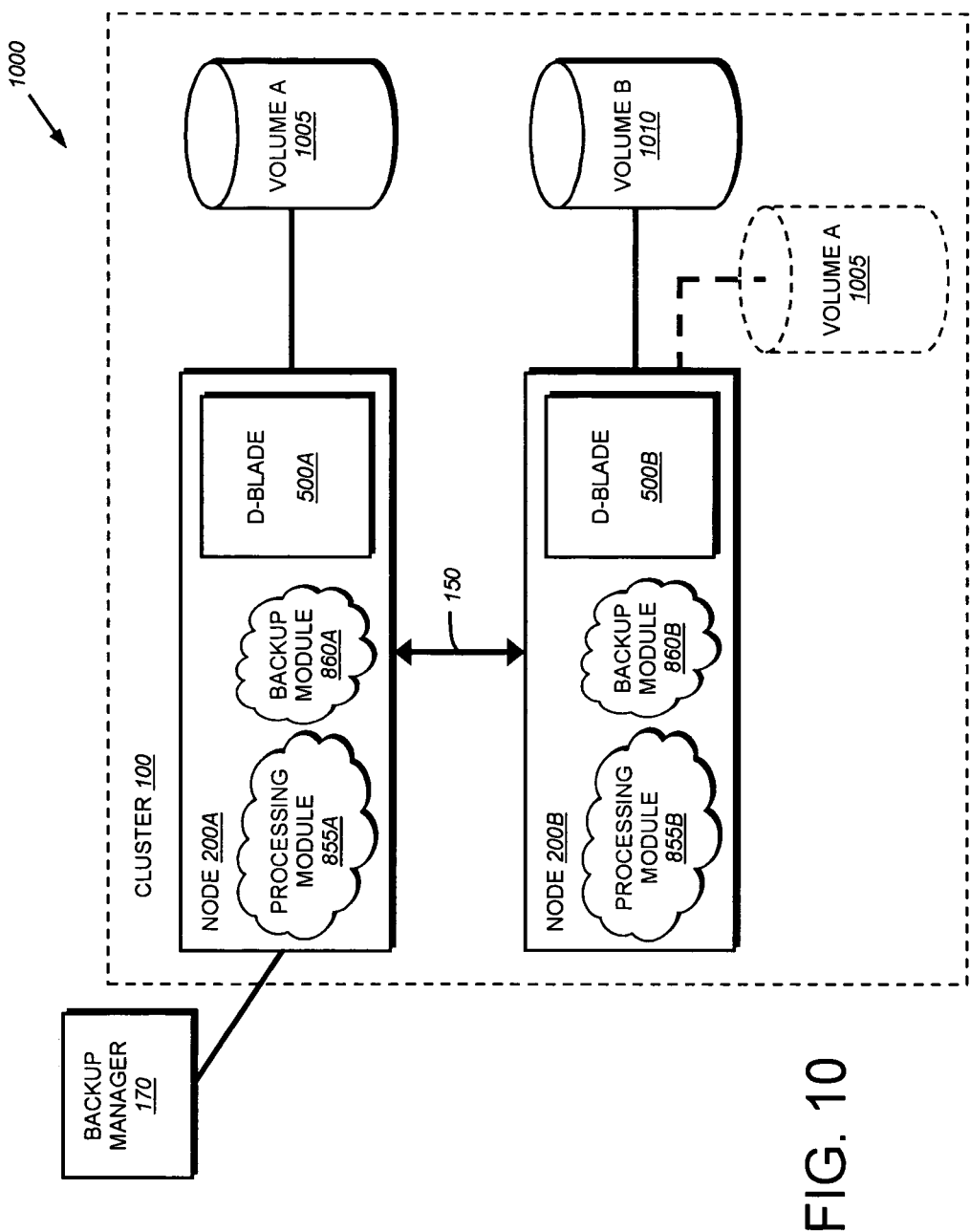
FIG. 10 is a schematic block diagram of an exemplary cluster in accordance with an embodiment of the present invention.

FIG. 10 is a schematic block diagram of an exemplary cluster 1000 in accordance with an embodiment of the present invention. The cluster 1000 comprises two nodes 200 A, B configured to serve volumes A 1005 and volume B 1010, respectively. It should be noted that the present invention may be utilized with arbitrarily sized clusters and that a two-node cluster is shown for ease of explanation only. As such, it should be noted that the two-node cluster is exemplary only and should not be taken to limit the scope of the present invention.

Interfacing with the cluster 1000 is a backup manager 170 which, in accordance with the illustrative embodiment of the present invention, comprises a separate computer executing specialized backup software, such as VERITAS NetBackup, available from VERITAS Software Corporation of Mountain View, Calif. A processing module 855A and backup module 860A of an NDMP daemon, such as NDMP daemon 840, executes on node 200A. In addition, a processing module 855B and a backup module 860B of a similar NDMP daemon executes on node 200B.

Assume backup manager 170 sends a NDMP data access request to a first node 200A of the cluster 1000 to initiate a backup operation of a data container, such as a volume. Illustratively, the backup manager transmits a NDMP_DATA_START_BACKUP operation request to node 200A. The processing module 855A of node 200A receives the request and determines whether the volume targeted by the request is serviced by the node locally, e.g., using volume A 1005, or whether the volume is serviced by another remote node, e.g., using volume B 1010. The local processing module illustratively renders this determination by querying the VLDB 830 to determine which D-blade in the cluster is currently servicing the targeted volume. If the volume is serviced locally, the processing module 855A dispatches the operation to the local D-blade 500A, which performs the operation to volume A 1005. Dispatching of the backup operation may illustratively invoke the dump engine 520 or other components of the D-blade to process the operation by, e.g., obtaining appropriate metadata regarding the volume.

However, if the operation is not directed to the local volume 1005, but rather a remote volume such as volume B 1010, the local processing module 855A passes the operation to the local backup module 860A, which forwards the operation via a first RPC to the appropriate remote node 200B over the cluster switching fabric 150. For example, the backup module 860A forwards (proxies) the NDMP_DATA_START_BACKUP operation via the first RPC to node 200B over the cluster switching fabric 150. In the illustrative embodiment, the local backup module 855A may maintain a data structure, such as a table (not shown) of outstanding requests that it has proxied to enable matching of received responses from remote nodes.

The proxied operation is received by the remote backup module 860B on remote node 200B, which passes the operation to the remote processing module 855B. The processing module 855B then dispatches the backup operation to the appropriate components of the remote D-blade 500B to perform the requested operation. Any responses are forwarded by remote backup module 860B over the switching fabric 150 the local backup module 860A which, in conjunction with local processing module 855A, returns the response to backup manager 170. For example, the remote backup module 860B may return a NDMP_DATA_START_BACKUP_REPLY response to the local backup module 860A which, in turn, forwards the response to the processing module 855A for transmission to the backup manager 170. Note that if an event occurs to remote volume B 1010, a NDMP notice is generated by the remote backup module 860B and returned to the backup manager 170 via the local backup module 860A and local processing module 855A, as described above.

Advantageously, the novel proxying invention obviates the need to reconfigure the backup manager 170 (i.e., with respect to the local NDMP daemon to which it interfaces in the cluster) when using the NDMP protocol in a unified namespace cluster, particularly when volumes in the cluster are relocated from node to node for failover and/or load balancing purposes. For example after relocation of the volumes, the local processing module 855A queries the VLDB to determine that volume A 1005 is no longer local to node 200A and, accordingly, cooperates with the local backup module 860A to forward the operation to the appropriate remote node 200B for processing. Responses are then returned to the backup manager via the local processing module of local NDMP daemon. The novel invention thus enables an administrator to exploit the ease of management feature provided by the unified namespace in combination with cluster configuration in the cluster.

Figure 11:
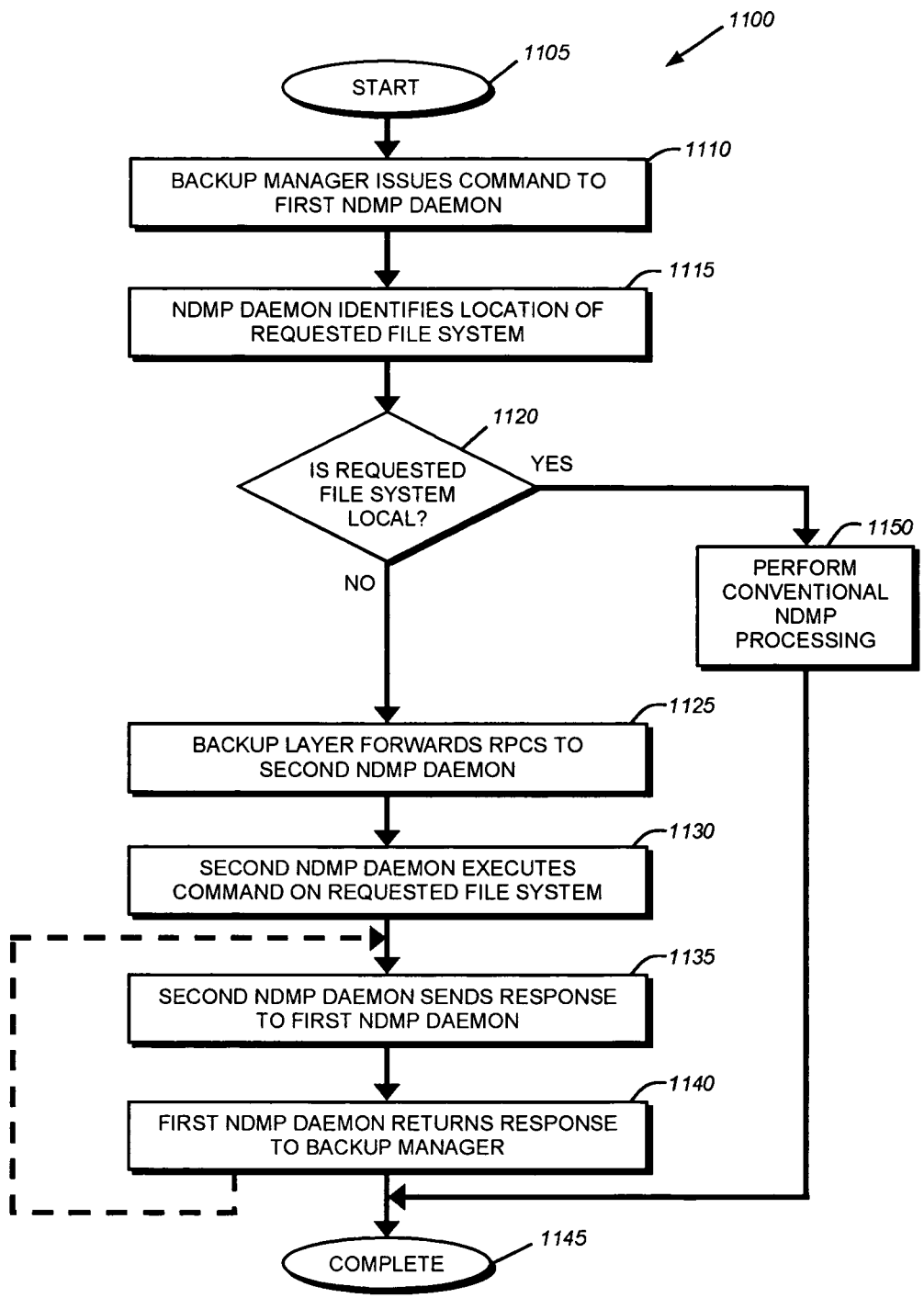
FIG. 11 is a flow chart detailing the steps of a procedure for processing network data management protocol commands in accordance with an embodiment of the present intervention.

FIG. 11 is a flowchart detailing the steps of a procedure 1100 for processing NDMP operations in accordance with an embodiment of the present intervention. The procedure 1100 begins in step 1105 and continues to step 1110 where a backup manager issues a data access request to perform any conventional NDMP command as defined in the above-incorporated NDMP specification to a first NDMP daemon executing on a first node of the cluster. Illustratively, the NDMP command is a backup operation directed to a requested volume in the cluster. In response to receiving the command, the first NDMP daemon identifies the location of the requested volume (e.g., file system) in step 1115. As noted, the location of the requested volume is identified by querying the VLDB to determine the D-blade currently servicing the volume. In step 1120, the processing module determines whether the requested volume is local to the node executing the first NDMP daemon. If so, the procedure branches to step 1150, where the command is dispatched to the local D-blade for conventional NDMP processing before the procedure completes in step 1145.

If the requested volume is not local, the backup module of the first NDMP daemon forwards the command to a second NDMP daemon via at least one (first) RPC in step 1125. In step 1130, the second NDMP daemon executes the command on the requested volume and, in step 1135, any response, such as an error condition or status indicator, is forwarded from the second NDMP daemon to the first NDMP daemon via a (second) RPC. In step 1140, the first NDMP daemon returns the response to the backup manager and the procedure completes in step 1145. As can be appreciated, the present invention apportions processing of NDMP commands between the processing and backup modules of the NDMP daemon. To that end, the backup module functions as an interface for intra-cluster communication and proxying of the commands, whereas the processing module provides "front-end" processing and interfacing with the backup manager. Accordingly, the first NDMP daemon serves as a proxy for one or more NDMP daemons in accordance with illustrative embodiment.

Figure 12:
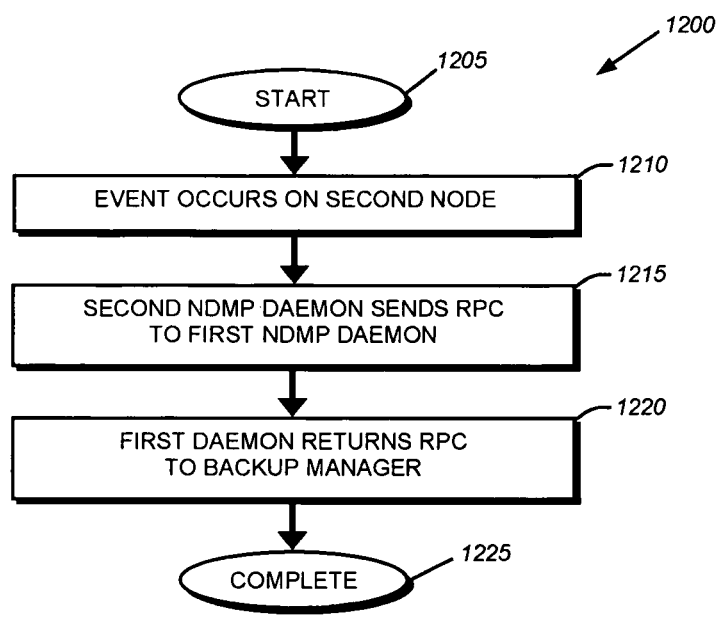
FIG. 12 is a flowchart detailing the steps of a procedure for processing event notifications in accordance with an embodiment of the present invention.

FIG. 12 is a flowchart detailing the steps of a procedure 1200 for sending event notices from a second node destined to a backup manager in accordance with an embodiment of the present invention. Such event notices may be required during a long running operation, such as a backup operation. The procedure 1200 begins in step 1205 and continues to step 1210 where an event, such as completion of a file recovery operation, occurs on the second node. In response, the second NDMP daemon sends a (third) RPC to the first NDMP daemon in step 1215. In the example of recovery of a specified file, the second NDMP daemon may send a NDMP_LOG_FILE RPC to the first NDMP daemon. The first NDMP daemon then returns the received RPC to the backup manager in step 1220 before the procedure completes in step 1225. Thus, the first NDMP daemon may forward the NDMP_LOG_FILE RPC received from the second NDMP daemon to the backup manager.

It should be noted that while the present invention is described in terms of using NDMP, the teachings of the present invention may be utilized with any network management protocol. As such, the use of NDMP should be taken as exemplary only. Additionally, the present invention is described in terms of a NDMP daemon having two constituent modules, namely a processing module and a backup module. In alternate embodiments of the present intervention, the functionality of the processing module and backup module may be combined into a single module or may be distributed among a differing number of modules. As such, the description of a processing module and backup module within an NDMP daemon should be taken as exemplary only.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:
    receiving, at a local backup daemon executing on a first node of a cluster of a plurality of nodes, a backup operation from a backup manager, the backup operation directed to a data container previously served by the first node of the cluster, wherein the local backup daemon interfaces with the backup manager to interpret the backup operation;
    determining that the first node previously served the data container by querying a volume location database (VLDB) on the first node; and
    in response to determining that the first node previously served the data container:
        forwarding the backup operation from the local backup daemon to a remote backup daemon executing on a second node of the cluster configured to service the data container, and
        performing the backup operation directed to the data container by the remote backup daemon executing on the second node in the cluster, wherein the local backup daemon acts as a proxy between the backup manager and the remote backup daemon by communicating via one or more remote procedure calls to complete the backup operation by the second node in the cluster.

2. The method of claim 1 wherein the data container comprises a volume.

3. The method of claim 1 wherein the data container comprises a file system.

4. The method of claim 1 wherein the backup operation is defined by a network data management protocol.

5. The method of claim 1 further comprising:
    forwarding a response from the second node to the first node; and returning the response from the first node to the backup manager.

6. The method of claim 1 wherein the local backup daemon is a protocol daemon.

7. The method of claim 6 wherein the local backup daemon comprises a processing module configured to process the command.

8. The method of claim 6 wherein the local backup daemon comprises a backup module configured to forward the command to the second node serving the data container.

9. A system configured to process a backup operation to a data container, the system comprising:
   a local backup daemon executing on a first node of a cluster, the first node having a processor and a memory, the local backup daemon configured to:
      receive, from a backup manager, a backup operation directed to a data container of the cluster,
      query a volume location database (VLDB) to determine whether the first node is configured to service the data container,
      initiate and execute the backup operation on the data container in response to determining that the first node is configured to service the data container, and
      forward the backup operation over a computer network to a remote backup daemon executing on a second node to initiate and execute the backup operation on the data container by the remote backup daemon, in response to determining that the first node is not configured to service the data container, where the first node acts as a proxy between the backup manager and the remote backup daemon by communicating via one or more remote procedure calls to complete the backup operation by the second node.

10. The system of claim 9 wherein the backup operation is associated with a network data management protocol.

11. The system of claim 9 wherein the data container comprises a volume.

12. The system of claim 9 wherein the data container comprises a file system.

13. The system of claim 9 wherein the backup operation comprises a network data management protocol command.

14. The system of claim 9 wherein the local backup daemon further comprises a processing module configured to determine whether the data container is local to and serviced by the first node and further configured to interface with the backup manager.

15. The system of claim 9 wherein the local backup daemon further comprises a backup module configured to forward the backup operation to the remote backup daemon executing on the second node for processing.

16. The system of claim 9 wherein the remote backup daemon further comprises a backup module configured to receive the backup operation from the local backup daemon and to process, in conjunction with a processing module of the remote backup daemon, the backup operation.

17. A non-transitory computer readable medium containing executable program instructions executed by a processor, comprising:
   program instructions that receive, from a backup manager and at a local backup daemon executing on a first node of a cluster having a plurality of nodes, a backup operation directed to a data container previously served by the first node of the cluster, wherein the local backup daemon interfaces with the backup manager to interpret the backup operation;
   program instructions that determine that the first node previously serviced the data container by querying a volume location database (VLDB) on the first node; and
   program instructions that, in response to determining that the first node previously serviced the data container, forward the backup operation from the local backup daemon to a remote backup daemon executing on a second node of the cluster, where the backup operation directed to the data container is performed on the second node in the cluster, wherein the local backup daemon acts as a proxy between the backup manager and the remote backup daemon by communicating via one or more remote procedure calls to complete the backup operation by the second node in the cluster.

* * * * *